United States Patent
Saklatvala

(10) Patent No.: US 10,699,158 B2
(45) Date of Patent: *Jun. 30, 2020

(54) USING A PROBABILISTIC MODEL FOR DETECTING AN OBJECT IN VISUAL DATA

(71) Applicant: Open Text Corporation, Waterloo (CA)

(72) Inventor: George Saklatvala, Cambridge (GB)

(73) Assignee: Open Text Corporation, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/532,702

(22) Filed: Aug. 6, 2019

(65) Prior Publication Data

US 2019/0362181 A1    Nov. 28, 2019

Related U.S. Application Data

(63) Continuation of application No. 15/864,839, filed on Jan. 8, 2018, now Pat. No. 10,417,522, which is a continuation of application No. 15/420,515, filed on Jan. 31, 2017, now Pat. No. 9,892,339, which is a continuation of application No. 14/434,056, filed as application No. PCT/EP2012/070159 on Oct. 11, 2012, now Pat. No. 9,594,942.

(51) Int. Cl.
| | |
|---|---|
| G06K 9/00 | (2006.01) |
| G06K 9/62 | (2006.01) |
| G06K 9/46 | (2006.01) |
| H04L 29/08 | (2006.01) |

(52) U.S. Cl.
CPC ........ G06K 9/6211 (2013.01); G06K 9/00214 (2013.01); G06K 9/4604 (2013.01); G06K 9/6201 (2013.01); H04L 67/10 (2013.01)

(58) Field of Classification Search
CPC ............... G06K 9/6211; G06K 9/4604; G06K 9/00214; G06K 9/6201; H04L 67/10
See application file for complete search history.

(56) References Cited

U.S. PATENT DOCUMENTS

| | | | |
|---|---|---|---|
| 5,850,470 | A | 12/1998 | Kung |
| 5,943,435 | A | 8/1999 | Gaborski |
| 6,597,801 | B1 | 7/2003 | Cham |
| 6,618,490 | B1 | 9/2003 | Cham |
| 6,741,756 | B1 | 5/2004 | Toyama |
| 6,912,298 | B1 | 6/2005 | Wilensky |

(Continued)

FOREIGN PATENT DOCUMENTS

| | | |
|---|---|---|
| CN | 101765019 | 6/2010 |
| CN | 101251898 | 9/2010 |
| WO | WO 2011/161084 | 12/2011 |

OTHER PUBLICATIONS

Duda et al, "Pattern Classification: Introduction," John Wiley & Sons, Jan. 1, 2001, 13 pgs.

(Continued)

*Primary Examiner* — Aaron W Carter
(74) *Attorney, Agent, or Firm* — Sprinkle IP Law Group

(57) ABSTRACT

A probabilistic model is provided based on an output of a matching procedure that matches a particular object to representations of objects, where the probabilistic model relates a probability of an object being present to a number of matching features. The probabilistic model is used for detecting whether a particular object is present in received visual data.

20 Claims, 5 Drawing Sheets

(56) References Cited

U.S. PATENT DOCUMENTS

| | | |
|---|---|---|
| 7,957,584 B2 | 6/2011 | Najafi |
| 8,160,309 B1 | 4/2012 | Tzur |
| 8,995,758 B1 | 3/2015 | Bissacco |
| 9,424,461 B1 | 8/2016 | Yuan et al. |
| 9,594,942 B2 | 3/2017 | Saklatvala |
| 9,892,339 B2 | 2/2018 | Saklatvala |
| 10,417,522 B2 | 9/2019 | Saklatvala |
| 2002/0159627 A1 | 10/2002 | Schneiderman |
| 2002/0169532 A1 | 11/2002 | Zhang |
| 2003/0026483 A1 | 2/2003 | Perona |
| 2004/0258309 A1 | 12/2004 | Keaton |
| 2005/0169529 A1 | 8/2005 | Owechko |
| 2005/0223031 A1 | 10/2005 | Zisserman |
| 2005/0286767 A1 | 12/2005 | Hager |
| 2006/0013450 A1 | 1/2006 | Shan |
| 2006/0228026 A1 | 10/2006 | Xiong |
| 2006/0233423 A1 | 10/2006 | Najafi |
| 2006/0285755 A1 | 12/2006 | Hager et al. |
| 2007/0041615 A1 | 2/2007 | Chan |
| 2007/0073749 A1 | 3/2007 | Fan |
| 2007/0098254 A1 | 5/2007 | Yang |
| 2008/0112593 A1 | 5/2008 | Ratner |
| 2009/0144033 A1 | 6/2009 | Liu |
| 2009/0161962 A1 | 6/2009 | Gallagher |
| 2009/0190798 A1 | 7/2009 | Lee |
| 2009/0290020 A1 | 11/2009 | McLeish |
| 2010/0104158 A1 | 4/2010 | Shechtman |
| 2010/0310158 A1 | 12/2010 | Fu |
| 2011/0208685 A1 | 8/2011 | Ganapathi |
| 2011/0229032 A1 | 9/2011 | Ranganathan |
| 2011/0235910 A1 | 9/2011 | Soceanu |
| 2011/0286674 A1 | 11/2011 | Campbelle et al. |
| 2011/0299770 A1 | 12/2011 | Vaddadi |
| 2012/0045132 A1 | 2/2012 | Wong |
| 2012/0045134 A1 | 2/2012 | Perronnin |
| 2012/0050525 A1 | 3/2012 | Rinner et al. |
| 2012/0155718 A1 | 6/2012 | Hwang |
| 2012/0207346 A1 | 8/2012 | Kohli |
| 2012/0209514 A1 | 8/2012 | Chrysanthakopoulos |
| 2012/0269425 A1 | 10/2012 | Marchesotti et al. |
| 2012/0281911 A1 | 11/2012 | Fung |
| 2013/0041640 A1 | 2/2013 | Miller |
| 2013/0084007 A1 | 4/2013 | Salamati |
| 2013/0107071 A1 | 5/2013 | Tang |
| 2013/0294651 A1 | 11/2013 | Zhou |
| 2013/0308861 A1 | 11/2013 | Cordara et al. |
| 2014/0363143 A1 | 12/2014 | Dharssi |
| 2014/0365506 A1 | 12/2014 | Gong |
| 2015/0178293 A1 | 6/2015 | Chrysanthakopoulos |
| 2015/0347851 A1 | 12/2015 | Saklatvala |
| 2015/0371085 A1 | 12/2015 | Hudson |
| 2016/0086334 A1 | 3/2016 | Fan |
| 2017/0323217 A1 | 11/2017 | Saklatvala et al. |

OTHER PUBLICATIONS

International Search Report and Written Opinion for PCT Application No. PCT/EP2012/070159, dated Jun. 26, 2013, 12 pgs.

Kushal et al., "Modeling 3D Objects from Stereo Views and Recognizing them in Photographs," ECCV 2006, Part II, Lecture Notes in Computer Science, 2006, vol. 3952, pp. 536-574, Springer-Verlag Berlin Heidelberg.

Lowe, "Local Feature View Clustering for 3D Object Recognition," Computer Vision and Pattern Recognition, Computer Vision and Pattern Recognition, Proceedings of the 2001 IEEE Computer Society Conference on CVPR, Dec. 2001, vol. 1, pp. I-682 to I-688, IEEE.

Reznik, "On MPEG work towards a standard for a visual search," Applications of Digital Image Processing XXXIV, Proceedings of SPIE, SPIE Optical Engineering + Applications, vol. 8135, 2011, 7 pgs.

Uchiyama et al., "Object Detection and Pose Tracking for Augmented Reality: Recent Approaches," 18th Korea-Japan Joint Workshop on Frontiers of Computer Vision (FCV), Feb. 2012, pp. 1-8.

"RANSAC: Random Sample Consensus," Wikipedia, last modified on Jun. 14, 2012, 5 pgs., retrieved online on Sep. 17, 2012, at http://en.wikipedia.org/wiki/RANSAC.

International Preliminary Report on Patentability and Written Opinion for PCT Application No. PCT/EP2012/070159, dated Apr. 14, 2015, 7 pgs.

Office Action for U.S. Appl. No. 14/434,056, dated May 31, 2016, 12 pgs.

Office Action for European Patent Application No. 12784483.5, dated Aug. 9, 2016, 3 pgs.

Office Action for U.S. Appl. No. 15/420,515, dated Apr. 17, 2017, 10 pgs.

Tissainayagam et al., "Object Tracking in Image Sequences using Point Features," pp. 69-74, retrieved Jul. 17, 2017 from http://citeseerx.ist.psu.edu/viewdoc/download?doi=10.1.1.58.1962&rep=rep1&type=pdf.

"Object Detection in a Cluttered Scene Using Point Feature Matching," 10 pgs., retrieved Jul. 5, 2017 from https://www.mathworks.com/help/vision/examples/object-detection-in-a-cluttered-scene-using-point-feature-matching.html?requestedDomain=www.mathworks.com.

Office Action for Chinese Patent Application No. 201280077632.7, dated Feb. 6, 2018, 30 pgs.

Office Action for Chinese Patent Application No. 201280077632.7, dated Nov. 23, 2018, 21 pgs.

Lowe, David G., Object Recognition from Local Scale-Invariant Features, Proc. of the International Conf. on Computer Vision, Corfu, Sep. 1999, 8 pgs.

Notice of Allowance for U.S. Appl. No. 15/864,839, dated May 16, 2019, 6 pgs.

Office Action with English translation for Chinese Patent Application No. 201280077632.7, dated Jun. 3, 2019, 6 pgs.

Notice of Allowance for U.S. Appl. No. 15/864,839, dated Jul. 18, 2019, 4 pgs.

USING A PROBABILISTIC MODEL FOR DETECTING AN OBJECT IN VISUAL DATA

CROSS-REFERENCE TO RELATED APPLICATIONS

This application is a continuation of, and claims a benefit of priority under 35 U.S.C. § 120 from, U.S. patent application Ser. No. 15/864,839, filed Jan. 8, 2018, issued as U.S. Pat. No. 10,417,522 entitled "USING A PROBABILISTIC MODEL FOR DETECTING AN OBJECT IN VISUAL DATA," which is a continuation of, and claims a benefit of priority under 35 U.S.C. 120 from, U.S. patent application Ser. No. 15/420,515, filed Jan. 31, 2017, issued as U.S. Pat. No. 9,892,339, entitled "USING A PROBABILISTIC MODEL FOR DETECTING AN OBJECT IN VISUAL DATA," which is a continuation of, and claims a benefit of priority under 35 U.S.C. § 120 from, U.S. patent application Ser. No. 14/434,056, filed Apr. 7, 2015, issued as U.S. Pat. No. 9,594,942, entitled "USING A PROBABILISTIC MODEL FOR DETECTING AN OBJECT IN VISUAL DATA," which claims priority under 35 U.S.C. 371 to International Application No. PCT/EP2012/070159, filed Oct. 11, 2012. All applications listed in this paragraph are fully incorporated by reference herein for all purposes.

BACKGROUND

Object recognition can be performed to detect presence of a particular object in an image. Object detection can be based on matching features in the image with features of a representation of the particular object, where the representation can be a model of the particular object. A matching procedure may indicate that the particular object is in the image if a number of matching features between the image and the representation of the object exceeds a fixed threshold.

BRIEF DESCRIPTION OF THE DRAWINGS

Some embodiments are described with respect to the following figures.

DETAILED DESCRIPTION

Figure 1:
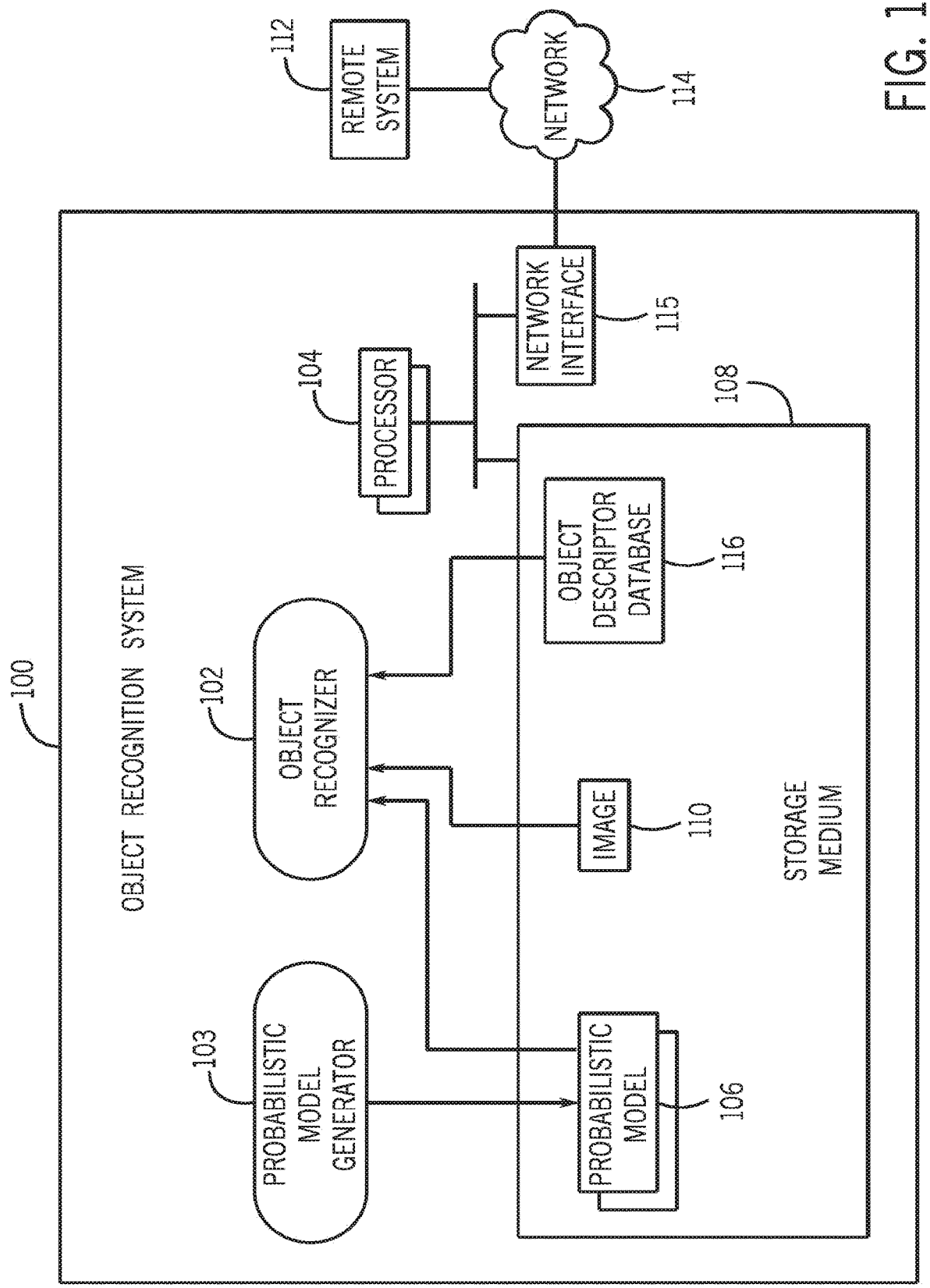
FIG. 1 is a block diagram of an example arrangement that includes an object detection system according to some implementations.

To perform object recognition to detect presence of an object in visual data (e.g., an image, video data, etc.), an object recognition procedure can extract features from the visual data for comparison with respective features of a given representation (e.g., model) of the object. Examples of objects that are to be detected in visual data can include the following: photographs, posters, product packaging (e.g., boxes, bottles, cans, etc.), billboards, buildings, monuments, vehicles, landscapes, and so forth.

A match is considered to have occurred (in other words, the object is considered to be present in the visual data) if the number of matching features between the visual data and the representation of the object exceeds some specified threshold. Different types of objects can include different numbers of features that are useable for matching to respective representations of objects. For example, a first type of object can include a first number of features that are useable for matching to a representation of the first type of object, while a second type of object can include a second, different number of features that are useable for matching to a representation of the second type of object.

Using a fixed threshold for the number of matching features for indicating whether or not a number of matching features indicates a successful match may result in some types of objects being unreliably detected, if such types of objects do not contain a sufficient number of useable features to be able to satisfy the fixed number threshold. On the other hand, use of the fixed threshold for the number of matching features may result in a relatively large number of false positives when performing object recognition for other types of objects that may include a larger number of useable features for matching.

Although it may be possible to manually tune thresholds for corresponding different types of objects, such a manual tuning process can be labor intensive and may be prone to human error.

In accordance with some implementations, instead of using a fixed threshold for the number of matching features, a probabilistic model can be used in an object recognition procedure to determine whether or not an object is present in visual data. In the ensuing discussion, reference is made to determining presence of an object in an image. However, in other implementations, an object recognition procedure using a probabilistic model can be applied to determine presence of an object in other types of visual data, such as video data and so forth.

The probabilistic model relates a probability to a number of matching features. The probability is a probability that an object is present in an image. By using the probabilistic model, instead of specifying a fixed threshold for the number of matching features, a probability threshold can be specified instead. The probability threshold can be the same for different types of objects.

By using the probabilistic model, the determination of whether or not an object recognition procedure has detected an object in an image is based on the probability threshold. Multiple probabilistic models can be provided for respective different types of objects.

In some implementations, to determine whether a particular object is in an image, an object recognition procedure can use a probabilistic model (corresponding to the particular object) to convert a number of matches between an image and a corresponding object to a probability value. The probability value can be compared to the probability threshold to determine whether a match is present that indicates that the particular object is in the image.

In alternative implementations, the object recognition procedure can use a probabilistic model to convert the probability threshold to a corresponding number threshold, where the number threshold indicates a number of matching features above which an object is considered to be present in an image. The number of matches between an image and a corresponding object can then be compared to the number threshold to determine whether a match is present.

In the latter implementations, for each type of object, the respective probabilistic model can relate the probability threshold to a corresponding number threshold. For different types of objects, the respective probabilistic models can relate the probability threshold to different number thresholds. By providing different number thresholds based on the probabilistic models rather than the same fixed number threshold, for different types of objects, more reliable object recognition for the different types of objects can be achieved.

In some examples, the multiple number thresholds for different types of objects can be stored in a lookup table or other lookup data structure. When attempting to determine whether a particular object is in an image, the lookup table or other lookup data structure can be accessed to retrieve the corresponding number threshold to use in the object recognition procedure.

Although reference is made to use of multiple probabilistic models for different types of objects, it is noted that in alternative implementations, one probabilistic model can be used for multiple different types of objects. An input to the probabilistic model in such implementations would include an indication of the type of object, and the probabilistic model can then use this type indication to perform the respective conversion between a probability value and a number of matching features.

In some implementations, the features that can be extracted from an image for comparison with a representation (e.g., model) of an object can be point features. A point feature refers to an element (referred to as a "descriptor") that is extracted from a given image patch (which can have a predefined size, such as a 16×16 grid or other size). Within an image, a number of point features can be extracted, which can be compared to reference point features in the representation of an object. Examples of point features include SIFT (scale invariant feature transforms) features, SURF (speeded up robust features), and others. In other examples, instead of using point features, other types of features can be used, such as line features, block features, and so forth.

In the ensuing discussion, it is assumed that point features are extracted for performing object recognition in an image. Identifying matches between point features in an image and point features in a representation of the object is referred to as identifying point correspondences. Although reference is made to matching point features in the ensuing discussion, it is noted that similar techniques can be applied to matching other types of features in other implementations.

FIG. 1 illustrates an object recognition system 100 that includes an object recognizer 102 according to some implementations. The object recognition system 100 can include a computer or a distributed arrangement of computers. The object recognizer 102 can be executed on one or multiple processors 104. The object recognizer 102 is able to access probabilistic models 106, which are stored in a storage medium (or storage media) 108, for use in performing an object recognition procedure to detect presence of an object in an image 110.

The image 110 can also be stored in the storage medium (or storage media) 108. The image 110 can be received by the object recognition system 100 from a remote source, in some examples. One such remote source can be the remote system 112 that is coupled to the object recognition system 100 over a network 114. The object recognition system 100 can communicate over the network 114 through a network interface 115 in the object recognition system 100. The remote system 112 can include a camera that captured the image 110. In alternative implementations, the camera can be part of the object recognition system 100.

The probabilistic models 106 can be produced by a probabilistic model generator 103, which can be executed on the processor(s) 104 of the object recognition system 100. In other examples, the probabilistic model generator 103 can be executed in a different system from the object recognizer 102. In such latter examples, the probabilistic models 106 generated by the probabilistic model generator 103 can be received by the object recognition system 100 from the system in which the probabilistic model generator 103 executes.

An object descriptor database 116 can also be stored in the storage medium (storage media) 108 of the object recognition system. Alternatively, the object descriptor database 116 can be stored in a storage subsystem that is outside the object recognition system 100. The object descriptor database 116 contains models of various different objects. Each object model contains descriptors (that describe point features or other types of features) of the corresponding object.

The object recognizer 102 can extract point features from the image 110, and can compare the extracted point features to the corresponding point features of the object models in the object descriptor database 116 to determine whether a particular object (from among the objects represented by the object models) is present in the image 110.

Figure 2:
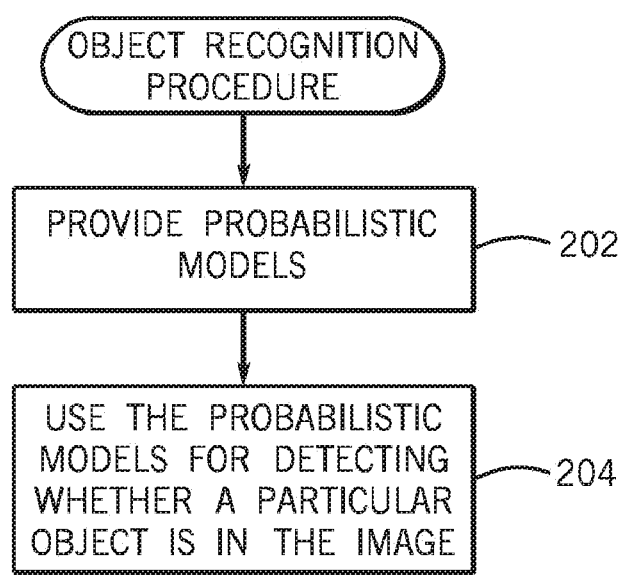
FIG. 2 is a flow diagram of an object recognition procedure in accordance with some implementations.

FIG. 2 is a process that can be performed by the object recognizer 102 in accordance with some implementations. The process provides (at 202) the probabilistic models 106. Providing the probabilistic models 106 can include: (1) generating, in the object recognition system 100 by the probabilistic model generator 103, the probabilistic models 106, or (2) receiving, by the object recognition system 100 from another system, the probabilistic models 106.

The process of FIG. 2 further uses (at 204) the probabilistic models 106 for detecting whether a particular object is in the image 110. The object recognizer 102 can determine a number of point correspondences between the image 110 and a respective model of an object in the object descriptor database 116. As noted above, a point correspondence refers to a match between a point feature of the image 110 and a corresponding point feature of an object as represented by an object model.

In some implementations, the object recognizer 102 can use a respective probabilistic model 106 to map the number of point correspondences to a probability value, which can then be compared to a probability threshold. A match can be indicated (to indicate that the corresponding object is detected in the image 110) if the probability value exceeds the predetermined probability threshold.

In alternative implementations, for a particular object, the respective probabilistic model can be used to map the predetermined probability threshold to a respective number threshold. The number threshold specifies a number of point correspondences above which a match of an object to the image 110 is indicated. For detecting whether the particular object is present in the image 110, the number of point correspondences between the image 110 and the object model of the particular object is compared to the number threshold mapped by the probabilistic model, and a match is indicated if the number of point correspondences exceeds the number threshold.

In further implementations, a probabilistic model can incorporate information regarding a camera pose. In such implementations, the mapping between a probability value and a number of point correspondences can differ depending on the relative pose of the camera to an object.

Figure 3:
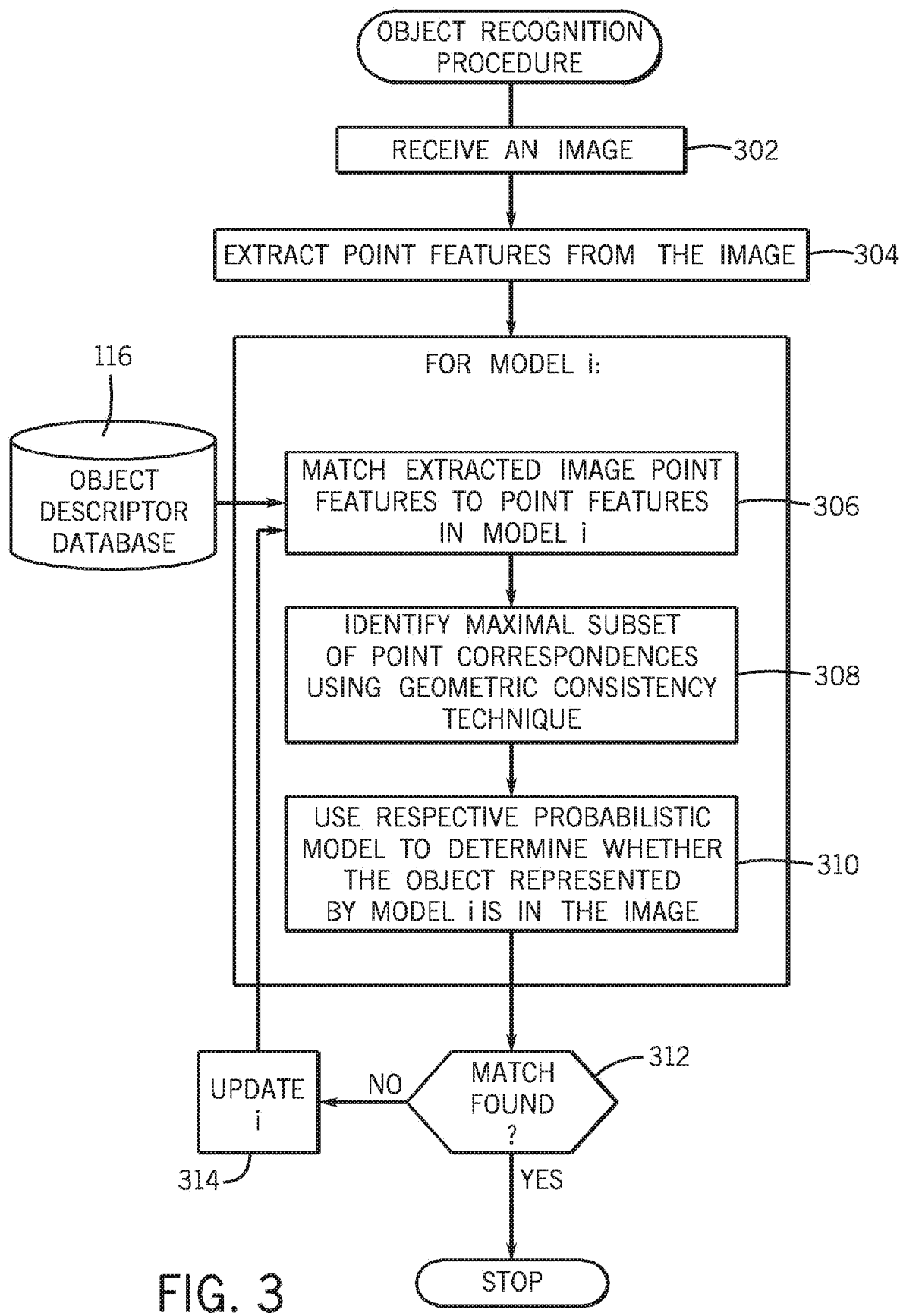
FIG. 3 is a flow diagram of an object recognition procedure in accordance with further implementations.

FIG. 3 is a process that can be performed by the object recognizer 102 in accordance with further implementations.

The object recognizer 102 receives (at 302) the image 110. The object recognizer 102 then extracts (at 304) point features from the image.

The following tasks of FIG. 3 are performed for each of multiple object models in the object descriptor database 116. For a model i of a respective object, the extracted point features from the image 110 are matched (at 306) to descriptors in model i in the object descriptor database 116. For each model i, the matching performed at 306 identifies a set of point correspondences.

The object recognizer 102 then identifies (at 308) a subset of the point correspondences in the set, where the point correspondences in the subset are those that are consistent with a given view of the object. There may be multiple possible views of the object corresponding to multiple possible relative poses (a pose can be defined by distance and angle) of a camera that captured the image 110.

It is possible that the set of point correspondences includes point correspondences for respective different views. The set of point correspondences may contain mismatches, resulting in different subsets of the point correspondences being consistent with respective different views. In some implementations, the subset identified at 308 is the maximal subset, which is the subset that has the largest number of point correspondences consistent with a given view of the object. This maximal subset and the associated given view will also provide the camera pose (e.g., distance and angle) with respect to the object.

The identification of the maximal subset of point correspondences can use a geometric consistency procedure. Given the set of point correspondences identified at 306 based on matching the image 10 to the model i in the object descriptor database 116, the geometric consistency technique attempts to select a maximal subset of the point correspondences that are consistent with a single view of the object.

In some examples, the geometric consistency technique can be an RANSAC (RANdom SAmple Consensus) technique. An example RANSAC technique is discussed below in connection with FIG. 5.

The object recognizer 102 then uses (at 310) the respective probabilistic model 106 (FIG. 1), for the type of object represented by model i, to determine whether the object represented by model i has been detected in the image 110. As noted above, there are several alternative techniques of making this determination. In some implementations, the object recognizer 102 can use the respective probabilistic model 106 to map the number of point correspondences in the maximal subset identified at 308 to a probability value, which can then be compared to a probability threshold. A match can be indicated if the probability value exceeds the probability threshold.

In alternative implementations, for the model i, the respective probabilistic model 106 can be used to map the predetermined probability threshold to a respective number threshold (a number of point correspondences above which a match is indicated). The object recognizer 102 can compare the number of point correspondences in the maximal subset identified at 308 to the number threshold for model i to determine whether there is a match. In some cases, a given probability threshold may not be mappable by a probabilistic model to a number threshold. In such a case, an object can be deemed undetectable with a specified confidence.

If the object recognizer determines (at 312) that a match between the image 110 and the object represented by model i is indicated at 310, then the process can stop. If a match is not indicated, then the process of FIG. 3 can proceed to the next model in the object descriptor database 116 by updating i (at 314).

Figure 4:
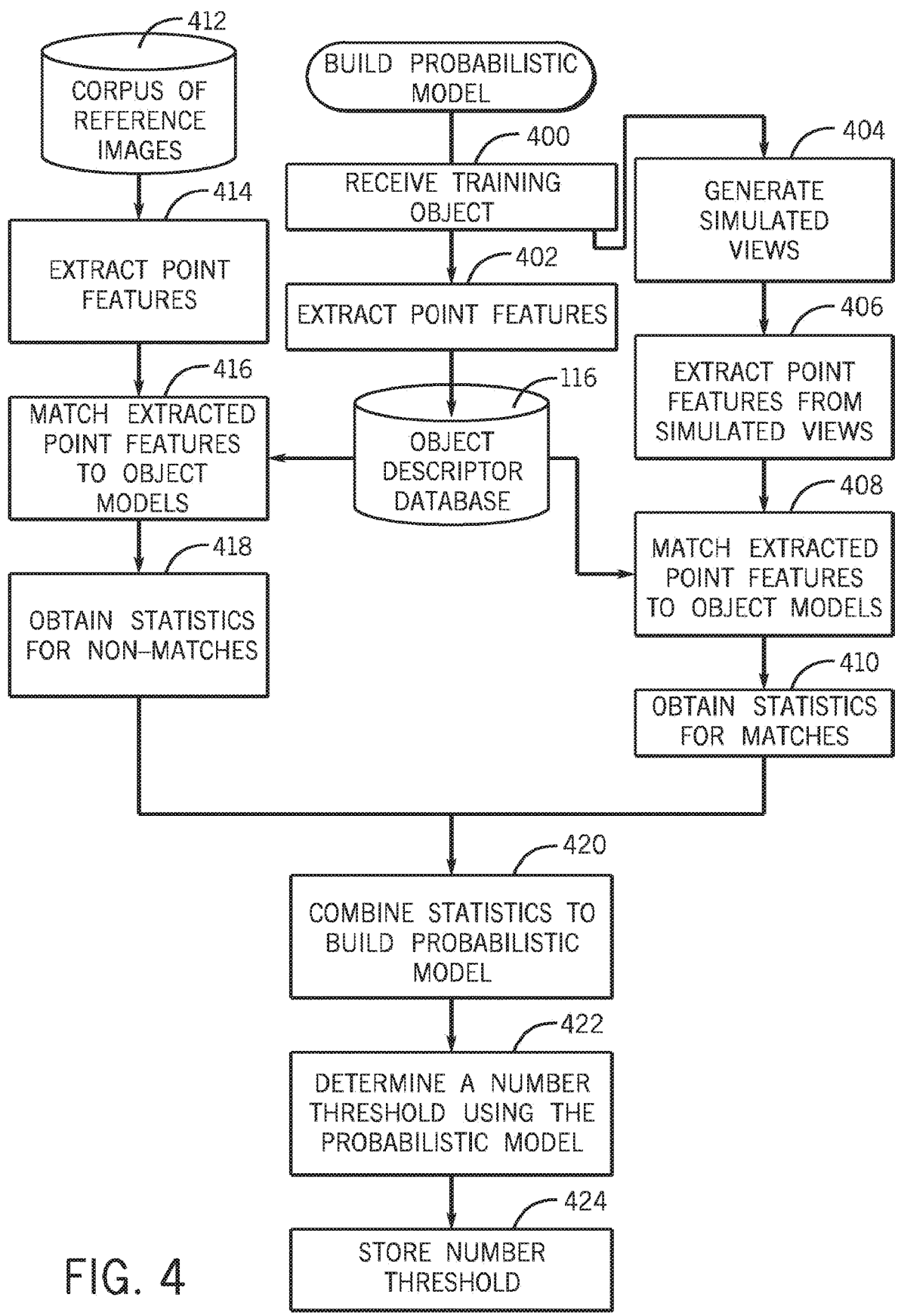
FIG. 4 is a flow diagram of a process of building a probabilistic model for a given object, in accordance with some implementations.

FIG. 4 depicts an example process of building a probabilistic model 106 for a particular type of object (referred to as the "training object"), in accordance with some implementations. The process can be performed by the probabilistic model generator 103 of FIG. 1, for example. The process of FIG. 4 can be reiterated for each of multiple different types of objects to build respective probabilistic models.

In alternative implementations, instead of building different probabilistic models for different types of objects, one probabilistic model can be produced, with the probabilistic model being able to perform different conversions between a probability value and a respective number of point correspondences for the different types of objects.

In the process of FIG. 4, the probabilistic model generator 103 receives (at 400) the training object. The point features of the training object are extracted (at 402), and such extracted features are stored in a model of the training object in the object descriptor database 116.

The process of FIG. 4 also generates (at 404) a number of simulated views of the training object. The simulated views are views that correspond to different poses of a camera with respect to the training object. For example, perspective or affine warps can be employed to compute the simulated views.

Point features are extracted (at 406) from each of the simulated views of the training object. The extracted features for each simulated view are then matched (at 408) to the object models in the object descriptor database 116. The matching performed at 408 uses a modified form of the object recognition procedure depicted in FIG. 3, as explained further below. The output of the matching at 408 produces various statistics, which are obtained (at 410). A respective collection of statistics is output by the match of each of the simulated views to the object models in the object descriptor database 116. As discussed further below, such statistics can include mean values and variance values.

The matching performed at 408 is based on the ground truth that the training object is present (since the simulated views are images that contain different views of the training object). Therefore, the statistics obtained at 410 are statistics for matches.

In addition, a separate sub-flow is provided in the process of FIG. 4 in which matching is performed with respect to reference images (contained in a corpus 412 of reference images) that are known to not include the training object. The process of FIG. 4 extracts (at 414) point features from each of the reference images. For each reference image, the extracted features are matched (at 416) to respective object models in the object descriptor database 116. The matching performed at 416 uses a modified form of the object recognition procedure depicted in FIG. 3, as explained further below.

A respective collection of multiple statistics is output based on the matching at 416 of a respective reference image to the object models is obtained (at 418). The matching performed at 416 is based on the ground truth that there should not be a match to the corresponding object in the object descriptor database 116. Therefore, the statistics obtained at 418 are statistics for non-matches. As discussed further below, such statistics can include mean values and variance values.

The statistics obtained at 410 and 418 are then combined (at 420) to build a probabilistic model for the training object (discussed further below). In some implementations, the probabilistic model can be used to determine (at 422) a number threshold, from the probability threshold, where the number threshold can be used in the object recognition procedure of FIG. 2 or 3. The computed number threshold is then stored (at 424) for later use.

In alternative implementations where the object recognition procedure of FIG. 2 or 3 performs comparisons to a probability threshold, the tasks 422 and 424 can be omitted, while the tasks 410, 418 and 420 are still performed.

An example probabilistic model that is built at 420 is discussed below, in accordance with some implementations. The probabilistic model has the following random variables: M (ground truth index of an object in the object descriptor database 116), O (empirical index of the object in the object descriptor database 116), and N (number of inliers observed consistent with the object). Predefined value(s) can be specified for M and N to denote no object (an example of such predefined value can be −1 or some other value).

An inlier can refer to a point correspondence between a point feature of an image and a point feature of a model of an object. N can represent the number of such point correspondences. More generally, an inlier can refer to any correspondence (match) between a feature of an image and a feature of an object model.

The ground truth index, M, is an identifier of a model in the object descriptor database 116 that represents the object that is actually in an image. The empirical index, O, is an identifier of a model in the object descriptor database 116 that represents the object that an object recognition procedure believes that the procedure is looking at.

The geometric consistency procedure applied at 308 in FIG. 3 outputs values for O and N. The probabilistic model can be represented as a conditional probability $P(M=m|O=m, N=n)$, where the probabilistic model provides the probability that a camera is actually looking at an object, $M=m$, given the measurements $O(=m)$ and $N(=n)$.

Applying Bayes' theorem twice, the conditional probability $P(M=m|O=m, N=n)$ can be derived as follows:

$$P(M = m \mid O = m, N = n) =$$
$$\frac{P(M = m) \cdot P(N = n \mid M = m, O = m) \cdot P(O = m \mid M = m)}{P(N = n \mid O = m) \cdot P(O = m)}$$

By marginalizing the first term in the denominator over M and simplifying, the following is obtained:

$$P(M = m \mid O = m, N = n) =$$
$$\frac{P(M = m) \cdot P(N = n \mid M = m, O = m) \cdot P(O = m \mid M = m)}{W}$$

where $W = P(N=n|O=m, M=m) \cdot P(M=m) \cdot P(O=m|M=m) + P(N=n|O=m, M \neq m) \cdot P(M \neq m) \cdot P(O=m|M \neq m)$.

Each of the terms of the above equation for deriving the conditional probability $P(M=m|O=m,N=n)$ is described below.

$P(M=m)$ is a prior probability for the object m. This can be assumed to be the same for all objects, in some examples. The prior probability, $P(M=m)$, expresses an uncertainty about the probability of the object m prior to data being received.

$P(N=n|M=m,O=m)$ is the probability of getting n inliers, given a correctly observed object m. This probability can be estimated from the statistics of the simulated views of the object m, obtained at 410 in FIG. 4. In some examples, a Gaussian distribution can be assumed with a mean estimated by the empirical mean number of inliers for the correct detections from simulated views of the object. The variance can also be estimated in this way. In other examples, the variance can be set equal to the mean. Setting variance equal to the mean is acceptable since this is the limit of a Poisson distribution.

Given the above, the probability $P(N=n|M=m,O=m)$ is derived as follows:

$$P(N = n \mid M = m, O = m) = \frac{1}{\sqrt{2\pi\mu_1(m)}} \cdot e - (n - \mu_1(m))^2/(\mu_1(m),$$

where $\mu_1(m)$ is the empirical mean number of inliers for correct matches of object m. In this example, $\mu_1(m)$, along with the corresponding variance, are the statistics obtained at 410. The foregoing equation assumes that mean is equal to variance.

$P(O=m|M=m)$ is the probability of observing object m correctly. This can be estimated from the statistics of the simulated views of the object (obtained at 410). In some examples, the probability can just be the fraction of detections that succeeded (in other words, the ratio of a number of successful matches of the simulated views to respective object models to a number of total matches performed).

$P(M \neq m)$ is the complement of the prior probability $P(M=m)$ for the object m. More specifically, $P(M \neq m)=1-P(M=m)$.

$P(N=n|M \neq m, O=m)$ is the probability of obtaining n inliers for an erroneous match against object m; in other words, when object m is not in fact in the image. This can be estimated from the statistics (obtained at 418) from matching the reference images against the object model for object m. The process can use the same Gaussian model as noted above, to derive the following:

$$P(N = n \mid M \neq m, O = m) = \frac{1}{\sqrt{2\pi\mu_2(m)}} \cdot e - (n - \mu_2(m))^2/(\mu_2(m),$$

where $\mu_2(m)$ is the empirical mean number of inliers for erroneous matches against object m. In the foregoing example, $\mu_2(m)$ along with the associated variance, can be the statistics obtained at 418. The foregoing equation assumes that mean is equal to variance.

According to the above, the probabilistic model provides a mapping between the probability of object m being in an image and a number of inliers, n. As explained above, this mapping can be used to convert the number of inliers for an object into a probability value to be compared to a probability threshold, which can be the same for all objects. Alternatively, by applying the inverse mapping, a probability threshold can be converted into an inlier count threshold, which is different for each model.

Figure 5:
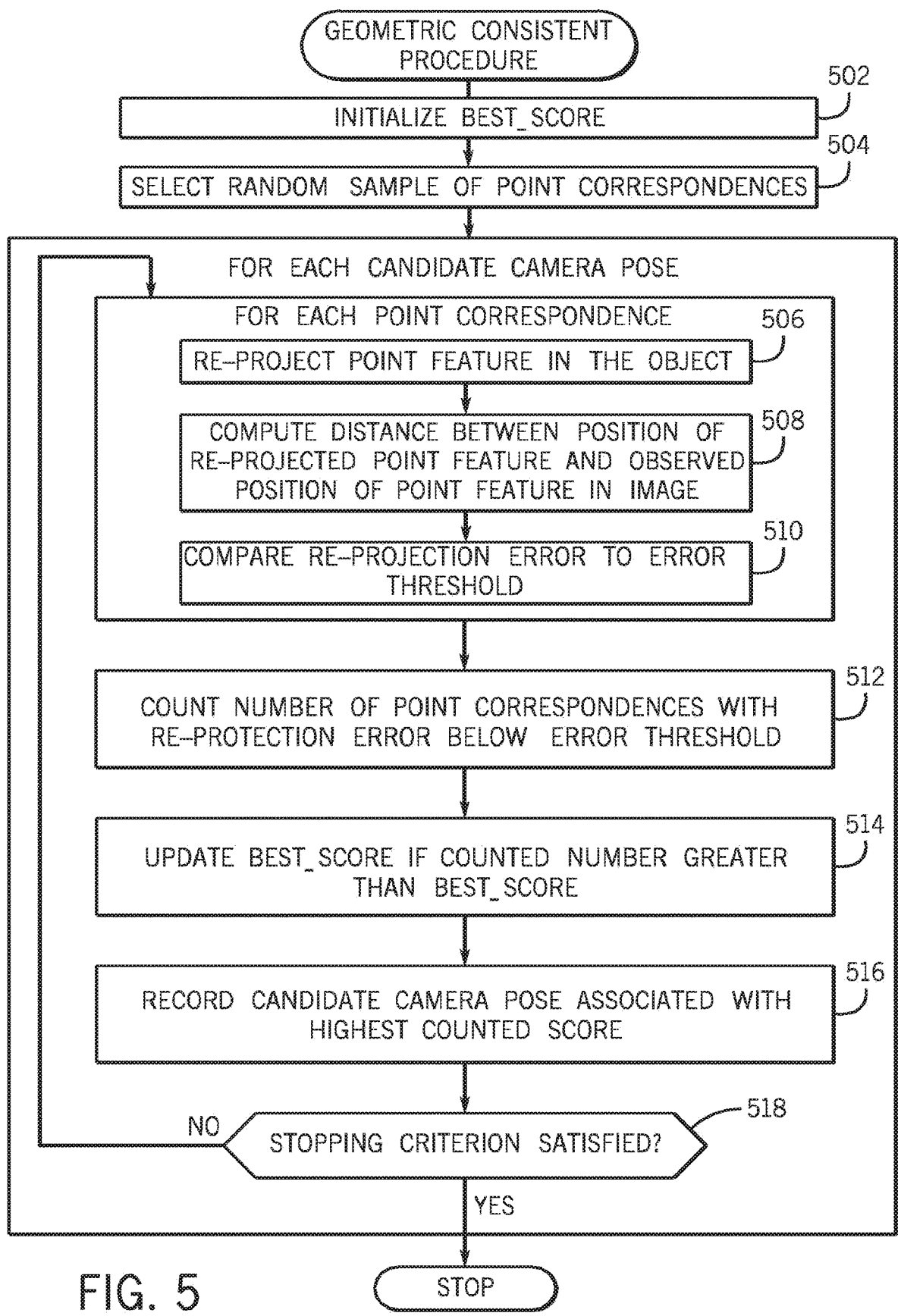
FIG. 5 is a flow diagram of a geometric consistent procedure useable in the object recognition procedure of FIG. 3, in accordance with some implementations.

FIG. 5 is a flow diagram of a geometric consistency procedure according to some implementations. FIG. 5 depicts a RANSAC (RANdom SAmple Consensus) technique. As discussed above, the geometric consistency procedure is performed at 308 in the object recognition procedure of FIG. 3 for matching an image to an object represented by a model of the object descriptor database 116.

A score Best Score is initialized (at 502) to zero (or some other initial value). A random sample of p (where p can be three or some other value) point correspondences are selected (at 504). This sample is then used to generate up to three candidate camera poses, such as by using a three-point pose technique. In the three-point pose technique, three geometric points can produce multiple poses of the camera.

For each candidate camera pose, the following is performed for each point correspondence. Note that a point correspondence is associated with a point feature in the image and a matching point feature in the object represented by a model of the object descriptor database 116. The position of the point feature in the object is re-projected (at 506) using the candidate camera pose. The re-projection effectively modifies the position of the point feature in the object to be consistent with the candidate camera pose.

The distance between the re-projected point feature in the object and the observed position of the corresponding point feature in the image is then computed (at 508), where this distance is referred to as the re-projection error. The re-projection error is compared (at 510) to an error threshold. The process identifies a point correspondence associated with a re-projection error below the error threshold as being an inlier.

The tasks 506, 508, and 510 are repeated for each of the other point correspondences in the random sample (that has p point correspondences).

The process next counts (at 512) the number of point correspondences with re-projection errors below the error threshold. This counted number is the score. If the counted score is greater than the current best score, Best Score, then Best Score is updated (at 514) to the counted score. Also, the candidate camera pose associated with the highest counted score so far is recorded (at 516).

The foregoing tasks are iterated until a stopping criterion is determined (at 518) to have been satisfied, where the stopping criterion can be the best score, Best Score, exceeding a predefined threshold, or a specified number of iterations have been performed. If the stopping criterion is not satisfied, then the tasks 504 to 518 are reiterated, where task 504 would select another random sample of p point correspondences.

After the stopping criterion is satisfied, then the best camera pose is determined (as recorded at 516), along with the corresponding counted score, which represents the number of inliers.

As noted above, the matching performed at 408 or 416 uses a modified form of the object recognition procedure depicted in FIG. 3. In the modified object recognition procedure, the geometric consistency procedure performed at 308 in FIG. 3 uses an error threshold of zero (or some other low value), which would lead to detection of larger numbers of inliers in the process described in FIG. 5.

Machine-readable instructions of modules described above (including the object recognizer 102 and probabilistic model generator 103 of FIG. 1) are loaded for execution on one or multiple processors (such as 104 in FIG. 1). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine naming the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method for building a probabilistic model for object detection, the method comprising:
   receiving, by a computer system having a processor and a non-transitory computer-readable medium, a training object;
   extracting, by the computer system, point features of the training object;
   storing, by the computer system, the point features of the given object thus extracted in an object model of the training object in an object descriptor database;
   generating, by the computer system, simulated views of the training object;
   extracting, by the computer system, point features from the simulated views of the training object;
   matching, by the computer system, the point features extracted from the simulated views of the training object with the point features of the given object in the object model of the training object stored in the object descriptor database;
   obtaining, by the computer system, matching statistics from the matching the point features extracted from the simulated views of the training object with the point features of the given object in the object model of the training object stored in the object descriptor database;
   extracting, by the computer system, point features from a plurality of reference images that are known to not include the training object;
   matching, by the computer system, the point features extracted from the plurality of reference objects with point features stored in object models in the object descriptor database;
   obtaining, by the computer system, non-matching statistics from the matching the point features extracted from the plurality of reference objects with the point features stored in the object models in the object descriptor database; and building, by the computer system, the probabilistic model based at least on the matching statistics and the non-matching statistics, wherein the probabilistic model comprises a conditional probability that a given object is present in visual data.

2. The method according to claim 1, wherein the simulated views correspond to different poses of a camera with respect to the training object.

3. The method according to claim 1, wherein the matching the point features extracted from the simulated views of the training object with the point features of the given object in the model of the training object stored in the object descriptor database is performed based on a ground truth that the training object is present in the object model of the training object and thus produces the matching statistics.

4. The method according to claim 1, wherein the matching the point features extracted from the plurality of reference objects with the point features stored in the object models in the object descriptor database is performed based on a ground truth that the plurality of reference objects does not have a match in the object models stored in the object descriptor database and thus produces the non-matching statistics.

5. The method according to claim 1, further comprising:
receiving the visual data;
extracting point features from the visual data;
comparing the point features extracted from the visual data with the point features stored in the object models in the object descriptor database, the comparing producing point correspondences between the point features extracted from the visual data and the point features stored in the object models in the object descriptor database;
mapping the point correspondences to a probability value;
comparing the probability value with a probability threshold; and
responsive to the probability value not less than the probability threshold, determining that the given object is present in the visual data.

6. The method according to claim 5, wherein the comparing the point features extracted from the visual data with the point features stored in the object models in the object descriptor database comprises performing a geometric consistency procedure for identifying a set of point correspondences consistent with a view of the given object.

7. The method according to claim 1, wherein the probabilistic model provides a mapping between a probability of a particular object being in an image and a number of point correspondences between a feature of the particular object and a feature of an object model in the object descriptor database.

8. A system for building a probabilistic model for object detection, the system comprising:
a processor;
a non-transitory computer memory; and
stored instructions translatable by the processor for:
receiving a training object;
extracting point features of the training object;
storing the point features of the given object thus extracted in an object model of the training object in an object descriptor database;
generating simulated views of the training object;
extracting point features from the simulated views of the training object;
matching the point features extracted from the simulated views of the training object with the point features of the given object in the object model of the training object stored in the object descriptor database;
obtaining matching statistics from the matching the point features extracted from the simulated views of the training object with the point features of the given object in the object model of the training object stored in the object descriptor database;
extracting point features from a plurality of reference images that are known to not include the training object;
matching the point features extracted from the plurality of reference objects with point features stored in object models in the object descriptor database;
obtaining non-matching statistics from the matching the point features extracted from the plurality of reference objects with the point features stored in the object models in the object descriptor database; and
building the probabilistic model based at least on the matching statistics and the non-matching statistics, wherein the probabilistic model comprises a conditional probability that a given object is present in visual data.

9. The system of claim 8, wherein the simulated views correspond to different poses of a camera with respect to the training object.

10. The system of claim 8, wherein the matching the point features extracted from the simulated views of the training object with the point features of the given object in the model of the training object stored in the object descriptor database is performed based on a ground truth that the training object is present in the object model of the training object and thus produces the matching statistics.

11. The system of claim 8, wherein the matching the point features extracted from the plurality of reference objects with the point features stored in the object models in the object descriptor database is performed based on a ground truth that the plurality of reference objects does not have a match in the object models stored in the object descriptor database and thus produces the non-matching statistics.

12. The system of claim 8, wherein the stored instructions are further translatable by the processor for:
receiving the visual data;
extracting point features from the visual data;
comparing the point features extracted from the visual data with the point features stored in the object models in the object descriptor database, the comparing producing point correspondences between the point features extracted from the visual data and the point features stored in the object models in the object descriptor database;
mapping the point correspondences to a probability value;
comparing the probability value with a probability threshold; and
responsive to the probability value not less than the probability threshold, determining that the given object is present in the visual data.

13. The system of claim 12, wherein the comparing the point features extracted from the visual data with the point features stored in the object models in the object descriptor database comprises performing a geometric consistency procedure for identifying a set of point correspondences consistent with a view of the given object.

14. The system of claim 8, wherein the probabilistic model provides a mapping between a probability of a particular object being in an image and a number of point correspondences between a feature of the particular object and a feature of an object model in the object descriptor database.

15. A computer program product for building a probabilistic model for object detection, the computer program product comprising a non-transitory computer-readable medium storing instructions translatable by a processor for:
receiving a training object;
extracting point features of the training object;
storing the point features of the given object thus extracted in an object model of the training object in an object descriptor database;
generating simulated views of the training object;
extracting point features from the simulated views of the training object;
matching the point features extracted from the simulated views of the training object with the point features of the given object in the object model of the training object stored in the object descriptor database;
obtaining matching statistics from the matching the point features extracted from the simulated views of the training object with the point features of the given object in the object model of the training object stored in the object descriptor database;
extracting point features from a plurality of reference images that are known to not include the training object;
matching the point features extracted from the plurality of reference objects with point features stored in object models in the object descriptor database;
obtaining non-matching statistics from the matching the point features extracted from the plurality of reference objects with the point features stored in the object models in the object descriptor database; and
building the probabilistic model based at least on the matching statistics and the non-matching statistics, wherein the probabilistic model comprises a conditional probability that a given object is present in visual data.

16. The computer program product of claim 15, wherein the simulated views correspond to different poses of a camera with respect to the training object.

17. The computer program product of claim 15, wherein the matching the point features extracted from the simulated views of the training object with the point features of the given object in the model of the training object stored in the object descriptor database is performed based on a ground truth that the training object is present in the object model of the training object and thus produces the matching statistics.

18. The computer program product of claim 15, wherein the matching the point features extracted from the plurality of reference objects with the point features stored in the object models in the object descriptor database is performed based on a ground truth that the plurality of reference objects does not have a match in the object models stored in the object descriptor database and thus produces the non-matching statistics.

19. The computer program product of claim 15, wherein the instructions are further translatable by the processor for:
receiving the visual data;
extracting point features from the visual data;
comparing the point features extracted from the visual data with the point features stored in the object models in the object descriptor database, the comparing producing point correspondences between the point features extracted from the visual data and the point features stored in the object models in the object descriptor database;
mapping the point correspondences to a probability value;
comparing the probability value with a probability threshold; and
responsive to the probability value not less than the probability threshold, determining that the given object is present in the visual data.

20. The computer program product of claim 15, wherein the probabilistic model provides a mapping between a probability of a particular object being in an image and a number of point correspondences between a feature of the particular object and a feature of an object model in the object descriptor database.

* * * * *